United States Patent [19]

Herring et al.

[11] Patent Number: 5,103,801
[45] Date of Patent: Apr. 14, 1992

[54] AUTOMATIC COOKING VESSEL

[75] Inventors: Charles W. Herring, Oak Brook Terrace; Clifford L. Peacock, Capron, both of Ill.

[73] Assignee: Keating of Chicago, Inc., Bellwood, Ill.

[21] Appl. No.: 491,040

[22] Filed: Mar. 8, 1990

[51] Int. Cl.$^5$ ............................................. A47J 27/00
[52] U.S. Cl. .................... 126/374; 126/351; 99/330; 99/331; 219/441; 392/454
[58] Field of Search ........................ 126/374, 351, 388; 99/330, 331; 392/454; 219/441, 442

[56] References Cited

U.S. PATENT DOCUMENTS

| | | | |
|---|---|---|---|
| 3,246,119 | 4/1966 | Kinsella | 392/454 |
| 3,353,002 | 11/1967 | Macoicz et al. | 392/454 |
| 3,431,395 | 3/1969 | McClure | 392/454 |
| 4,508,261 | 4/1985 | Blank | 126/374 |

Primary Examiner—Carroll B. Dority
Attorney, Agent, or Firm—Nicholas A. Camasto

[57] ABSTRACT

An automatic cooking vessel includes a container having a water level tube coupled to the lower portion thereof and extending upwardly and outwardly therefrom. A high water level and a low water level sensors are coupled to the interiors of respective portions of the water level tube. The water level tube provides a substantially straight, unobstructed entry to the container for ease of cleaning. Two heating units are positioned in the container above the entry point of the water level tube. Two temperature sensors are coupled to respective thermostats for controlling respective energy flow devices for supplying energy to the respective heating units. The energy flow devices are coupled in series so that for temperatures below a first temperature both heating units are operated and as the temperature approaches a second temperature, equal to the boiling point of water, only one of the heating units operates. Both electric and gas versions of the cooking vessel are shown.

10 Claims, 3 Drawing Sheets

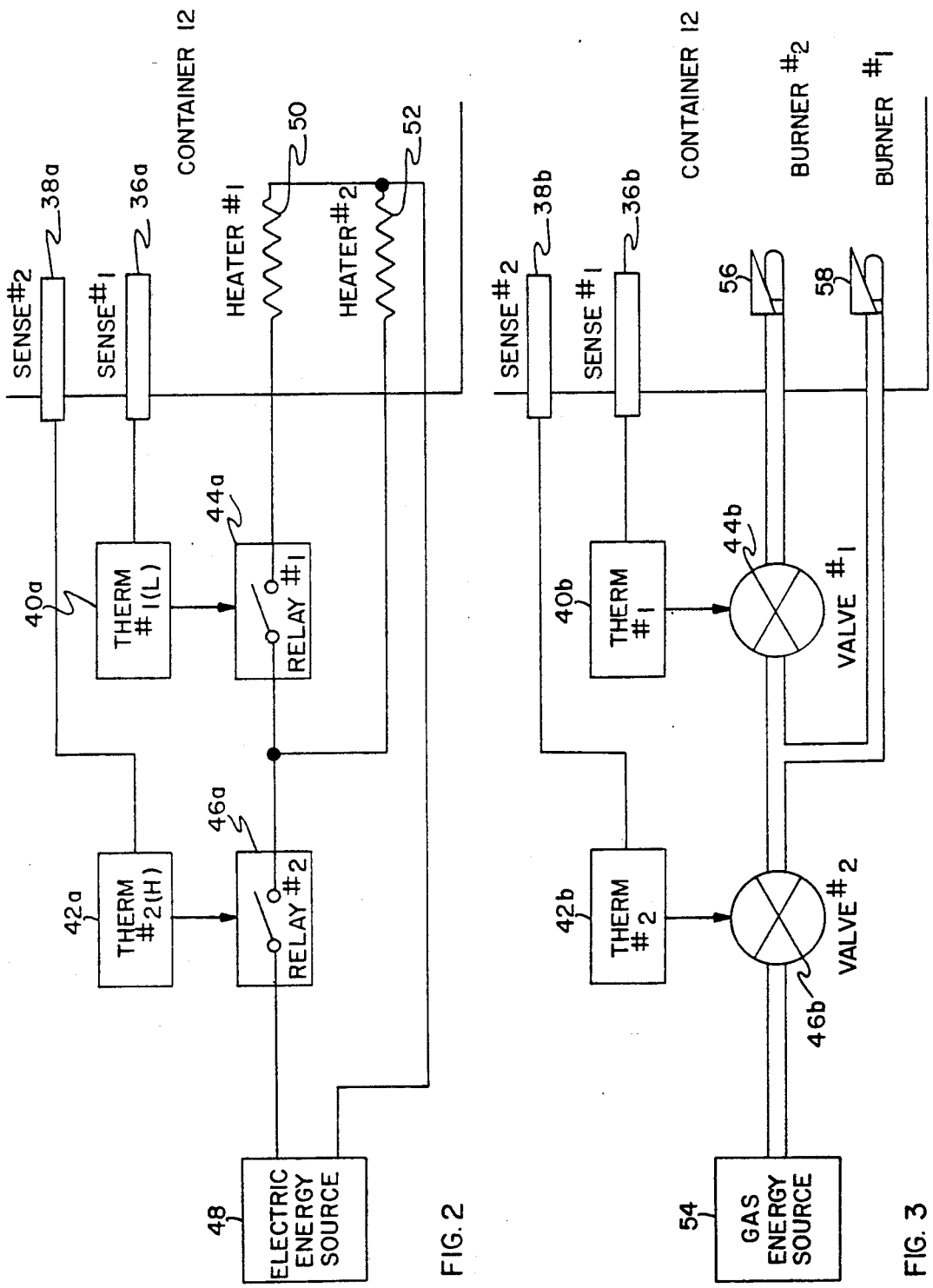

AUTOMATIC COOKING VESSEL

BACKGROUND OF THE INVENTION AND PRIOR ART

This invention relates generally to cooking vessels or containers and particularly to cooking vessels for commercial use, such as in restaurants and the like. The invention is specifically concerned with a pasta cooker in which the cooked product coacts with boiling water to develop a foam. The foam (as well as the agitation of the water due to boiling) often causes a conventional water level sensor to sense that the water level in the cooking vessel is higher than it really is.

The prior art discloses devices for "isolating" the water by use of a water level tube. The tube is external to the container and communicates with the container below the normal water level. Thus, the sensors in the water level tube are not subjected to the foaming and bubbling of the water that occurs in the container. The system of the invention utilizes a sensor tube that is coupled to the lower portion of the cooking vessel and isolated from the surface activity during boiling of foodstuffs, but is angled away from the container to form a substantially straight through passageway for enabling easy and thorough cleaning of the tube and container. In contrast to the prior art, there is a gradual radius at the bottom of the sensor tube where it communicates with the container. Such a bend is simple to negotiate with conventional cleaning equipment, unlike the angular bends of the prior art devices. Prior art sensor tubes that are positioned inside the container pose similar cleaning problems as well as taking up valuable cooking space.

The invention also includes an automatic control system for controlling the water temperature in the container. In particular, a pair of temperature sensors communicate with the water in the container with each sensor being coupled to a respective thermostat which, in turn, controls a respective energy flow device. In the gas version, the energy flow devices comprise gas valves and in the electric version, the energy flow devices comprise electrical relays. The energy flow devices supply energy to their respective heating units and are connected in series with the energy source. With the arrangement, one of the energy flow devices is cycled on and off in response to its thermostat and sensor when the temperature of the water is near boiling whereas the other energy flow device is cycled on and off by its associated thermostat and sensor at the boiling temperature of water. The precise settings of the thermostats may be adjusted in accordance with preferences of the cook. The inventive system enables very rapid heating of the water in the container by activating both heating units simultaneously as well as close control of the temperature rise in the container by turning one of the heating units off as the water in the vessel approaches the boiling temperature.

OBJECTS OF THE INVENTION

A principal object of the invention is to provide an improved automatic cooking vessel.

Another object of the invention is to provide an automatic cooking vessel that is easy to clean.

A further object of the invention is to provide an automatic cooking vessel arrangement that maintains close control over cooking temperature and provides rapid heating and recovering.

BRIEF DESCRIPTION OF THE DRAWINGS

These and other objects and advantages of the invention will be apparent upon reading the following description in conjunction with the drawings, in which:

FIG. 2 is a partial diagram illustrating an electrical version of the automatic temperature control system of the invention;

FIG. 3 is a partial diagram illustrating a gas version corresponding to FIG. 2.

DESCRIPTION OF THE PREFERRED EMBODIMENTS

Figure 1:
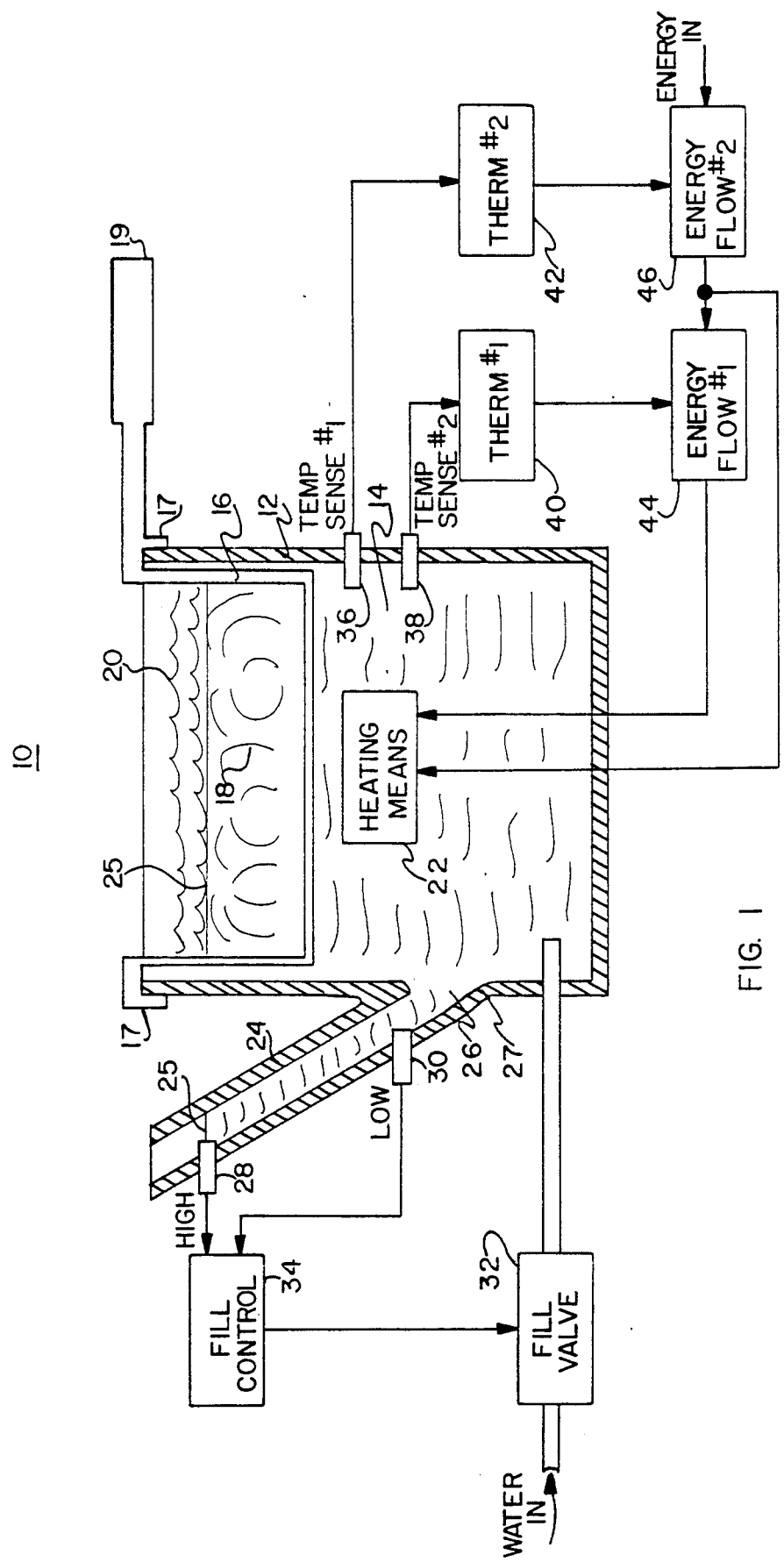
FIG. 1 is a schematic representation of an automatic cooking vessel constructed in accordance with the invention.

Referring to FIG. 1, a cooking vessel is generally identified by reference numeral 10. It includes a container 12 for holding a relatively large quantity of a cooking medium, such as water 14. A food holder or basket 16 of conventional design is supported within the water 14 in container 12 by means of hooked portions 17 which engage the upper edge of container 12. The basket 16 includes a handle 19 for ease and safety in handling hot cooked foods. A quantity of food 18 is shown supported in basket 16 in the water 14 in container 12. As indicated, a portion 20, above the actual surface 25 of the water 14, is turbulent and foamy due to the boiling action of the water and the nature of the particular food 18. In the preferred embodiment, the food is pasta, which contains a great deal of starch and produces a large amount of foam during cooking. A heating means 22 is positioned below basket 16 and in communication with water 14. The structure for supporting heating means 22 is not illustrated since such means are notoriously old in the art and form no part of the present invention.

A water level tube 24 is affixed to the lower portion of container 12 and angularly disposed with respect thereto. A slight radius 27 is included to facilitate welding of the tube 24 to the container 12. Tube 24 communicates with container 12 at a point below heating means 22 and forms an orifice 26 in the container. A pair of water level sensors 28 and 30 communicate with different portions of the interior of water level tube 24. As illustrated, a high water level sensor 28 communicates with the interior of the upper portion of water level tube 24 and a low water level sensor 30 is in communication with the interior of an intermediate portion of water level tube 24. Water level tube sensors 28 and 30 are coupled to a fill control unit 34 which in turn controls a water fill valve 32.

A pair of temperature sensors 36 and 38 communicate with the water 14 in container 12 and in turn are coupled to respective thermostats 40 and 42. The thermostats in turn control respective energy flow devices 44 and 46. As is more clearly illustrated in FIGS. 2 and 3, heating means 22 includes individual heating units which are controlled by respective ones of energy flow devices 44 and 46. The energy flow devices themselves are connected in series between a suitable energy source (not shown) and the heating means 22.

In operation, the water level sensors 28 and 30 sense the level of the water in water level tube 24. The surface 25 of the water 14 is below the foamy and turbulent portion 20. The foaming and turbulence are not present in water level tube 24 and consequently the high level sensor 28 senses the true water level 25 rather than an erroneous water level corresponding to portion 20. The angle that water level tube 24 makes with container 12 forms a substantially straight through passageway to orifice 26 in container 12, except for the slight radius 27 as mentioned, which facilitates the insertion of a conventional flexible bottle brush or the like for cleaning the tube. This is a key feature of the invention. Thus the cooking vessel constructed in accordance with the invention enables easy and thorough cleaning, which is highly desirable for commercial usage.

The automatic temperature control system for the cooking vessel includes temperature sensor 36 and its corresponding thermostat 42, which respond to the temperature of boiling water (212° F.), and temperature sensor 38 and its thermostat 40, which respond to a temperature about 10° below the temperature of boiling water. The energy flow devices 44 and 46 are individually operated by their corresponding thermostats 40 and 42. As the water 14 in container 12 is elevated in temperature, both energy flow devices supply energy to their respective heating units (not shown) in heating means 22. As the temperature of the water 14 approaches boiling, thermostat 40 cycles off and energy flow device 44 terminates the supply of energy to its associated heating unit in heating means 22. Thermostat 42 continues to maintain energy flow device 46 activated to supply energy to its associated heating unit in heating means 22 as the temperature of the water 14 continues to rise. At boiling temperature, thermostat 42 cycles and cuts off energy flow device 46. Thus both heating units in heating means 22 are cut off. The system enables rapid heating (and recovery) of the water in container 12 and yet permits close control of the water boiling point.

In FIG. 2, an electrical version of the automatic cooking vessel of the invention is illustrated. An electrical energy source 48 is connected to an electrical relay 46a which in turn is coupled to an electrical relay 44a. Relay 44a is connected to a heating element 50. The junction of relay 46a and relay 44a is connected to a heating element 52. The common terminal of heating elements 50 and 52 is returned to energy source 48. Relay 46a is controlled by thermostat 42a and relay 44a is controlled by thermostat 40a. The thermostats in turn are responsive to temperature sensing elements 38a and 36a, respectively, which are in communication with the water in container 12. As described, thermostat 44a is responsive to a temperature slightly below the boiling temperature of water whereas thermostat 42a is responsive to the boiling point of water. As the temperature of the water in the container approaches and reaches boiling temperature, the relays 46a and 44a are cycled on and off, as dictated by their respective thermostats, to maintain the water level temperature at substantially boiling point.

In FIG. 3, a gas version of the automatic cooking vessel of the invention is illustrated. A gas energy source 54 supplies energy to a gas valve 46b which in turn supplies a gas valve 44b and a gas burner 58. Gas valve 44b supplies a gas burner 56. A thermostat 42b controls the operation of gas valve 46b and a thermostat 40b controls gas valve 44b. The thermostats are in turn coupled to temperature sensing elements 38b and 36b, respectively, which are in communication with the water in container 12. The gas valves are cycled in substantially the same way as the electrical relays in FIG. 2 to maintain the temperature of the water in the cooking vessel by operation of gas burners 56 and 58.

Figure 4:
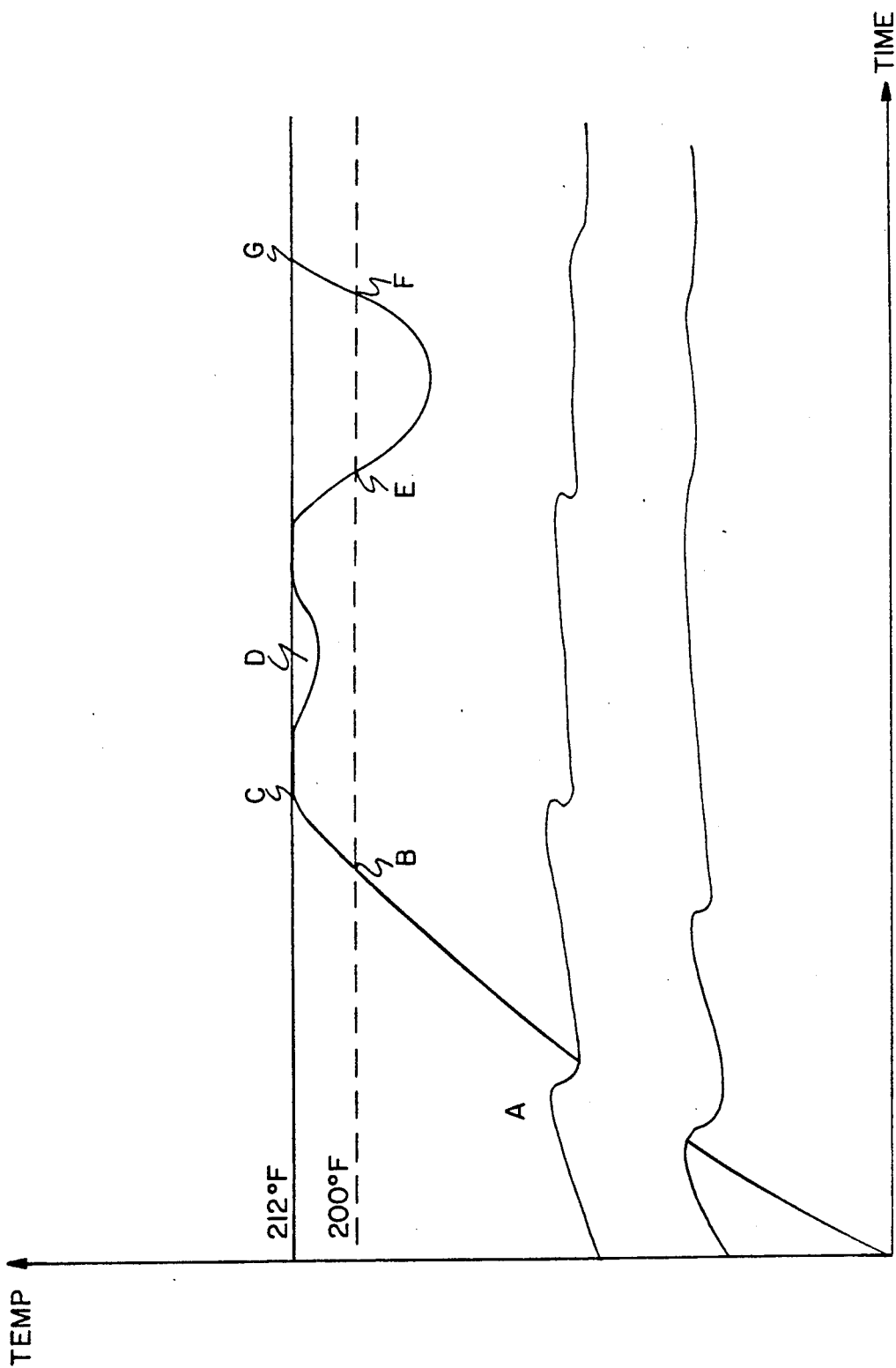
FIG. 4 illustrates a sample heating curve for an automatic temperature control system of the invention.

In FIG. 4, a sample temperature cycle is illustrated. Over portion A, the water is being elevated in temperature and both heating units are operating. When point B is reached (at about 200° F ), the first of the two heating units is cut off while the other continues operating until the temperature rises to the boiling point of water, illustrated at point C. Area D indicates a drop in temperature with subsequent recovery to the boiling point without reactivating the first heating unit. This may occur as a result of normal temperature drop, the addition of extra food to the container or due to replenishment of water by operation of the fill valve in response to the low water level sensor. Area E indicates a more pronounced drop in temperature due for example to the addition of a large quantity of food or the introduction of a large quantity of water by the fill valve. Looking at area E, when the 200° (dashed line) is crossed, the first heating unit is reactivated and both heating units are operated. As the water temperature recovers to point F, the first heating unit is cut off again and the second heating unit continues heating the water in the container until the boiling temperature is reached, indicated at point G. The cycle repeats as required, with large temperature drops, caused by the addition of food stuffs or replenishment of water in the container, resulting in both heating units being operated to rapidly restore the water temperature. As the water temperature approaches boiling , the first heating unit is cut out to permit close control of the amount of heat supplied to the water in the container.

What has been described is a novel automatic cooking system that provides the benefits of ease in cleaning and automatic temperature and water level control. It is recognized that numerous modifications and changes may be made to the described embodiments of the invention without departing from its true spirit and scope. The invention is to be limited only as defined in the claims.

What is claimed is:

1. A cooking vessel comprising:
   a container for holding water at a boiling temperature between a high water level and a low water level
   a water level tube communicating with said container below said low water level and extending upwardly and outwardly from said container, said tube forming a substantially straight, obstruction free, passage to said container for ease of cleaning
   a high water level sensor communicating with the interior of the upper part of said water level tube; and
   a low water level sensor communicating with the interior of the lower part of said water level tube.

2. The vessel of claim 1, further including heating means positioned in said container and wherein said water level tube communicates with said container below the level of said heating means.

3. The vessel of claim 2, further including fill means for supplying water to said container, said fill means including a fill valve and fill control means for opening and closing said fill valve responsive to said sensors.

4. A cooking vessel comprising:
   a container for holding water at a boiling temperature between a high water level and a low water level;

a water level tube communicating with said container below said low water level and extending upwardly and outwardly from said container, said tube forming a substantially straight, obstruction free, passage to said container for ease of cleaning;

a high water level sensor communicating with the interior of the upper part of said water level tube;

a low water level sensor communicating with the interior of the lower part of said water level tube;

heating means positioned in said container for heating said water;

said water level tube communicating with said container below the level of said heating means;

fill means for supplying water to said container; and said fill means including a fill valve and fill control means, said fill control means opening and closing said fill valve responsive to said sensors.

5. The vessel of claim 1 wherein said heating means include first and second gas burners and further including:

first and second thermostat means;

first and second temperature sensors, said temperature sensors communicating with the water in said container and with said first and second thermostat means, respectively; and first and second gas valves controlled by said first and second thermostat means, respectively, said first and second gas valves being coupled to respective ones of said first and second gas burners and in series with each other.

6. The vessel of claim 5, further including fill means for supplying water to said container said fill means including a fill valve and fill control means for opening and closing said fill valve responsive to said sensors.

7. The vessel of claim 1 wherein said heating means include first and second electric heating elements and further including:

first and second thermostat means;

first and second temperature sensors, said temperature sensors communicating with the water in said container and with said first and second thermostat means, respectively; and first and second relay means controlled by said first and second thermostat means, respectively, said first and second relay means being coupled across respective ones of said first and second heating elements and in series with each other.

8. The vessel of claim 7, further including fill means for supplying water to said container, said fill means including a fill valve and fill control means, responsive to said sensors, for opening and closing said fill valve.

9. An automatic temperature control system for a cooking vessel comprising:

a first temperature sensor for responding to a first temperature in said cooking vessel;

a second temperature sensor for responding to a second temperature in said cooking vessel;

first and second gas valves, respectively responsive to said first and second temperature sensors;

first and second gas burners, coupled to said first and second gas valves, respectively, said first gas valve controlling operation of said first gas burner and said second gas valve controlling operation of said second gas burner; and means connecting said first and said second gas valves in series with an energy source.

10. The temperature control system of claim 9 wherein said second temperature corresponds to that of boiling water; and wherein said first temperature is about 10° below said first temperature.

* * * * *

UNITED STATES PATENT AND TRADEMARK OFFICE
CERTIFICATE OF CORRECTION

PATENT NO. : 5,103,801
DATED : April 14, 1992
INVENTOR(S) : Charles W. Herring and Clifford L. Peacock It is certified that error appears in the above-identified patent and that said Letters Patent is hereby corrected as shown below:

Column 3, line 35, delete "out", insert --cut--;

Column 4, line 24, delete "out", insert --cut--;

line 46, after "level" (second occurrence), insert --;-- ;

line 51, after "cleaning", insert --;-- ;

Column 5, line 36, (Claim 6) after "container", insert --,-- .

Signed and Sealed this

Fourteenth Day of September, 1993

*Attest:*

BRUCE LEHMAN

*Attesting Officer*     *Commissioner of Patents and Trademarks*